United States Patent [19]
Yokota et al.

[11] Patent Number: 5,410,522
[45] Date of Patent: Apr. 25, 1995

[54] INFORMATION RECORDING/REPRODUCING APPARATUS FOR RECORDING INFORMATION IN ACCORDANCE WITH MARK INTERVAL OR MARK LENGTH RECORDING SCHEME, AND FOR REPRODUCING INFORMATION RECORDED IN ACCORDANCE WITH MARK INTERVAL OR MARK LENGTH RECORDING SCHEME

[75] Inventors: Tsuneshi Yokota, Kawasaki; Katsumi Suzuki, Tokyo; Tomohisa Yoshimaru, Yokohama, all of Japan

[73] Assignee: Kabushiki Kaisha Toshiba, Kawasaki, Japan

[21] Appl. No.: 25,776

[22] Filed: Mar. 3, 1993

[30] Foreign Application Priority Data

Mar. 23, 1992 [JP] Japan .................................. 4-065282

[51] Int. Cl.6 .............................................. G11B 17/22
[52] U.S. Cl. ........................................ 369/32; 369/47; 369/100
[58] Field of Search .................. 369/32, 100, 109, 116, 369/50, 59, 133, 240, 47, 44.29, 44.32, 124, 58, 44.34; 360/73.03, 27; 358/342, 338

[56] References Cited

U.S. PATENT DOCUMENTS

| | | | |
|---|---|---|---|
| 4,896,311 | 1/1990 | Ishihara | 369/47 |
| 5,003,527 | 3/1991 | Matsumoto et al. | 369/100 |
| 5,056,075 | 10/1991 | Makuta et al. | 369/44.29 |
| 5,142,521 | 8/1992 | Terashima et al. | 369/32 X |
| 5,214,627 | 5/1993 | Nakashima | 369/32 |

FOREIGN PATENT DOCUMENTS

3-144919   6/1991   Japan .

*Primary Examiner*—Robert J. Pascal
*Assistant Examiner*—Ali Neyzari
*Attorney, Agent, or Firm*—Cushman, Darby & Cushman

[57] ABSTRACT

An apparatus, having a spindle motor for rotating a circular optical disk, for recording information on the optical disk rotated by the spindle motor, and reproducing information recorded on the optical disk, wherein whether the recording scheme of the optical disk is a mark interval or mark length recording scheme is discriminated, and information is recorded or recorded information is reproduced while the optical disk is rotated at a rotational speed corresponding to the discriminated recording scheme. In an apparatus for recording-/reproducing information in accordance with both the mark interval and mark length recording schemes, a signal amplifier, a demodulation circuit, a modulation circuit, an error correction circuit, a buffer memory, an interface circuit, and the like can be commonly used between the two recording schemes, thereby decreasing the number of signal processing circuits.

6 Claims, 10 Drawing Sheets

FIG. 4A  2-7 CODE
FIG. 4B  2-7 MODULATION DATA
FIG. 4C  OUTPUT FROM FLIP-FLOP CIRCUIT 52 (MARK LENGTH DATA)
FIG. 4D  MARK INTERVAL RECORDING WAVEFORM
FIG. 4E  MARK LENGTH RECORDING WAVEFORM
FIG. 4F  MARK INTERVAL RECORDING PIT
FIG. 4G  MARK LENGTH RECORDING PIT
FIG. 4H  MARK INTERVAL RECORDING/REPRODUCTION SIGNAL
FIG. 4I  MARK LENGTH RECORDING/REPRODUCTION SIGNAL
FIG. 4J  MARK INTERVAL BINARY OUTPUT
FIG. 4K  MARK LENGTH BINARY OUTPUT
FIG. 4L  OUTPUT FROM DELAY CIRCUIT 31
FIG. 4M  OUTPUT FROM EDGE DETECTION CIRCUIT 26

INFORMATION RECORDING/REPRODUCING APPARATUS FOR RECORDING INFORMATION IN ACCORDANCE WITH MARK INTERVAL OR MARK LENGTH RECORDING SCHEME, AND FOR REPRODUCING INFORMATION RECORDED IN ACCORDANCE WITH MARK INTERVAL OR MARK LENGTH RECORDING SCHEME

BACKGROUND OF THE INVENTION

1. Field of the Invention

The present invention relates to an information recording/reproducing apparatus for recording information on, e.g., an optical disk in accordance with a mark interval recording scheme or a mark length recording scheme, and reproducing information recorded in accordance with the mark interval or mark length recording scheme.

2. Description of the Related Art

An optical disk apparatus as a conventional optical information recording/reproducing apparatus performs mark interval (pit position) recording as a scheme of recording digital data (recordings data) on a recording medium, e.g., an optical disk.

That is, in the mark interval recording scheme, information is recorded by means of the length of the pit-to-pit intervals.

Conventionally, mark interval (pit position) recording is performed as a scheme of recording information on a recording medium. Along with a development in a recording medium suitable for higher-density recording and in the scheme of recording information on the recording medium, mark length recording is becoming possible as a recording scheme.

That is, in the mark length recording scheme, pits having different lengths are formed, and information is recorded by means of the pit lengths and the lengths of the spaces between pits.

Theoretically, the mark length recording scheme has a recording density twice that of the conventional mark interval (pit position) recording scheme. However, due to the different recording schemes, an information recording/reproducing apparatus employing the mark length recording scheme cannot read information recorded on a recording medium in accordance with the conventional mark interval (pit position) recording scheme. Thus, compatibility cannot be obtained.

Hence, an information recording/reproducing apparatus that can record and reproduce information on and from both a recording medium of the conventional mark interval (pit position) recording scheme and a recording medium of the mark length recording scheme that enables a higher-density recording is developed.

In this information recording/reproducing apparatus, the signal processing speeds are different between the mark interval recording scheme and the mark length recording scheme, and each recording scheme requires separate signal processing circuits, e.g., a signal amplifier, a demodulation circuit, a modulation circuit, an error correction circuit, a buffer memory, and an interface circuit.

SUMMARY OF THE INVENTION

It is an object of the present invention to provide an information recording/reproducing apparatus for recording/reproducing information in accordance with two different recording schemes, i.e., the mark interval recording scheme and the mark length recording scheme, wherein the number of signal processing circuits can be decreased.

It is another object of the present invention to provide an information reproducing apparatus for reproducing information in accordance with two different recording schemes, i.e., the mark interval recording scheme and the mark length recording scheme, wherein the number of signal processing circuits can be decreased.

According to the present invention, there is provided an apparatus for recording data on a first type of recording medium on which pits having different width are formed and data is recorded by means of pit lengths and lengths of spaces between pits, or a second type of recording medium, on which data is recorded by means of lengths of pit-to-pit intervals and reproducing data recorded on the first and second recording mediums, the apparatus comprising: means for supporting a recording medium to record or reproduce data; means for discriminating the type of the recording medium supported by the supporting means; means for rotating the recording medium by a first rotational speed when the recording medium is discriminated as the first type recording medium, and rotating the recording medium by a second rotational speed higher than the first rotational speed when the recording medium is discriminated as the second type recording medium; means for recording data on the supported recording medium while the recording medium is rotated by the rotating means at a rotational speed corresponding to the type of the supported recording medium; and means for reproducing data recorded on the recording medium while the recording medium is rotated by the rotating means.

According to the present invention, there is provided an apparatus for reproducing data recorded on a first type recording medium, on which pits having different lengths are formed and data is recorded by means of pit widths and lengths of spaces between pits, or a second type recording medium on which data is recorded by means of lengths of pit-to-pit intervals, the apparatus comprising: means for supporting a recording medium to record or reproduce data; means for discriminating the type a of the recording medium supported by the supporting means; means for rotating the recording medium by a first rotational speed when the recording medium is discriminated as the first type recording medium, and rotating the recording medium by a second rotational speed higher than the first rotational speed when the recording medium is discriminated as the second type medium; and means for reproducing data recorded on the recording medium while the recording medium is rotated by the rotating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodi

DETAILED DESCRIPTION OF THE PREFERRED EMBODIMENTS

The preferred embodiments of the present invention will be described with reference to the accompanying drawings.

Figure 1:
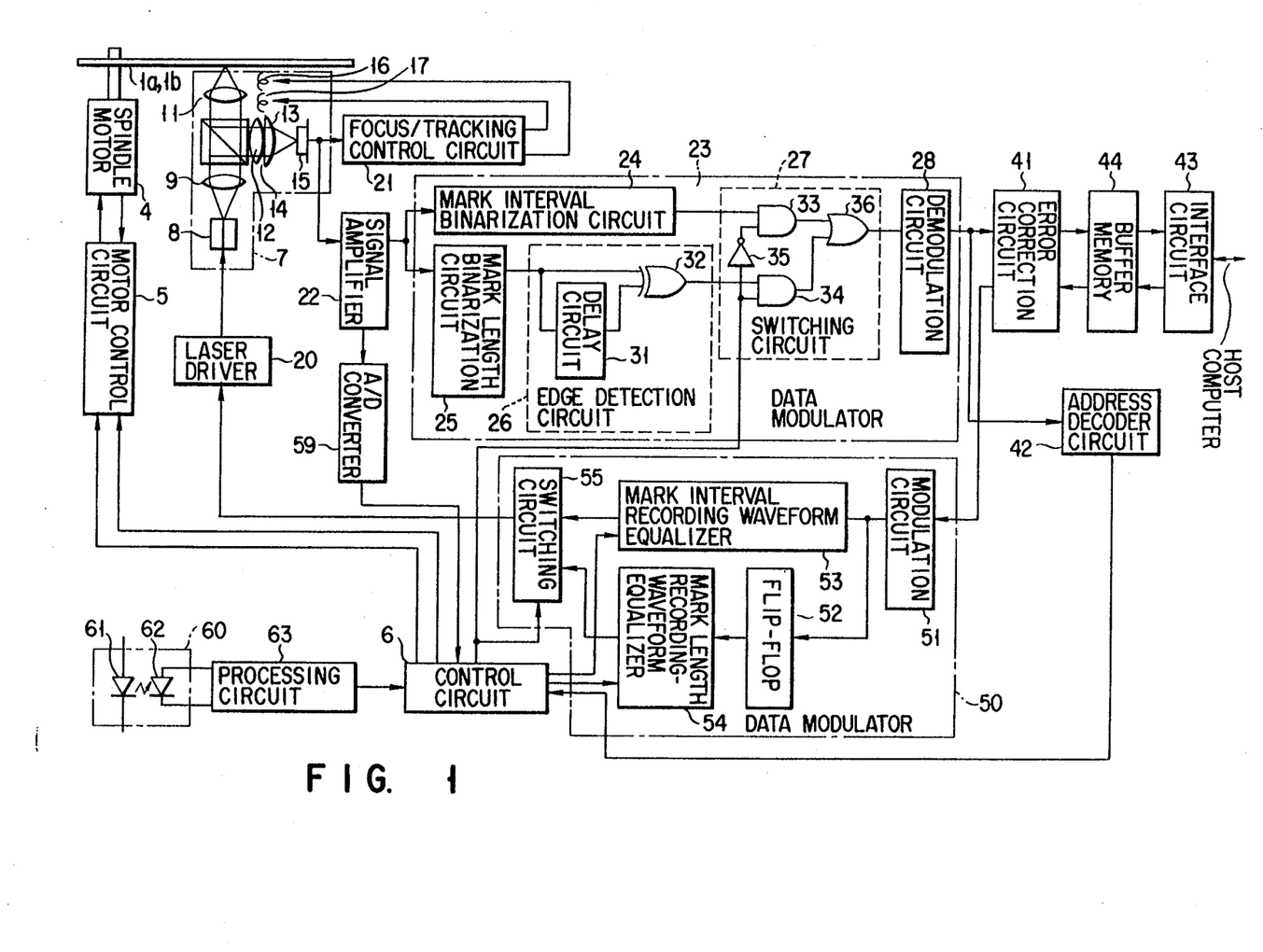
- FIG. 1 is a block diagram showing the arrangement of an optical disk apparatus according to an embodiment of the present invention.

FIG. 1 shows the schematic arrangement of an optical disk apparatus as an example of an information recording/reproducing apparatus according to the present invention. An optical disk serving as the information recording medium used in this optical disk apparatus is fabricated by annularly forming a metal coating layer of, e.g., tellurium or bismuth, on the surface of, e.g., a circular glass or plastic substrate.

Figure 2A:
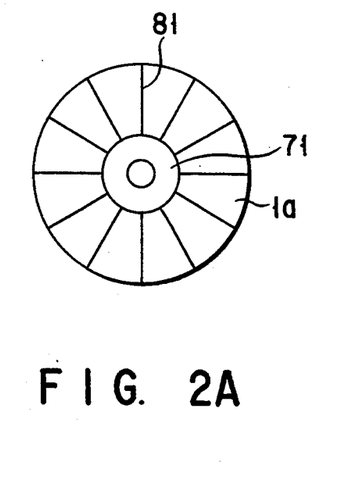
FIGS. 2A and 2B are diagrams for explaining optical disks employing different recording schemes.
Figure 2B:
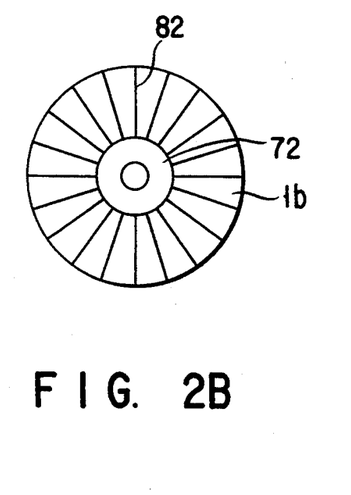

Examples of such an optical disk are an optical disk 1a, as shown in FIG. 2A, employing the mark interval (pit position) recording scheme, and an optical disk 1b, as shown in FIG. 2B, employing the mark length recording scheme.

Headers 81 and 82 serving as the address information portions are formed on the corresponding optical disks 1a and 1b in the embossed state and preformatted.

The mark length recording type optical disk 1b can record information amounting to about twice that recorded on the mark interval recording type optical disk 1a, and the number of headers (address information portions) 82 formed per track on the mark length recording type optical disk 1b is about twice that of the headers 81 on the mark interval recording type optical disk 1a.

Figure 3A:
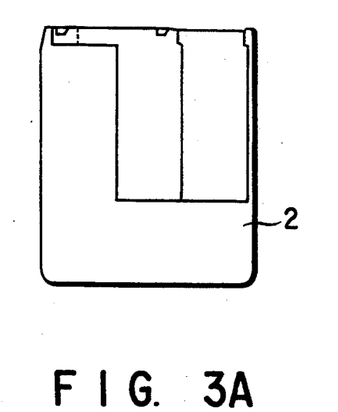
FIGS. 3A and 3B are diagrams for explaining cartridges storing the optical disks employing the different recording schemes.
Figure 3B:
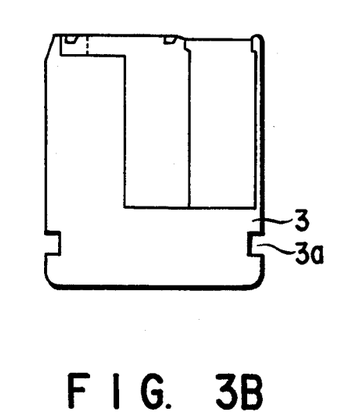

The mark interval recording type optical disk 1a and the mark length recording type optical disk 1b have different numbers of sectors, different numbers of addresses, different numbers of headers, and so on, and are respectively stored in cartridges 2 and 3 shown in FIGS. 3A and 3B. The outer sizes of the two types of cartridges 2 and 3 are the same, and the cartridge 3 is provided with an identifier 3a indicating that the recording scheme of the optical disk 1b stored in the cartridge 3 is the mark length recording scheme.

Each of the cartridges 2 and 3 storing the optical disks 1a and 1b can be detachably mounted on a spindle motor 4. The spindle motor 4 is rotated at predetermined rotational speeds. Start and stop of the rotation of the spindle motor 4 are controlled by a control signal output from a spindle motor control circuit 5.

The spindle motor control circuit 5 outputs the control signal in accordance with two different control signals output from a control circuit 6, so that the spindle motor control circuit 5 accurately rotates the spindle motor 4 at two different rotational speeds.

The rotational speed of the spindle motor 4 must be changed due to the following reason. When information is recorded/reproduced on and from recording media having different recording schemes by the same information recording/reproducing apparatus, the smaller the number of sets of two parallel circuits, the better. Even when the recording scheme is different, as far as the data transfer rate in recording/reproduction stays the same, data processing can be performed by the same circuits. In processing of the reproduction signal, if the reproduction signal has the same frequency band, most of the circuits can be commonly used between the different recording schemes.

The mark length recording scheme has a recording density almost twice that of the mark interval recording scheme. Therefore, in order to set the data transfer rate or the frequency band of the reproduction signal substantially equal to that in the mark interval recording scheme, the rotational speed must be decreased in mark length recording as compared to that in mark interval recording. When the rotational speed is set to be inversely proportional to the recording density, the number of circuit components can be decreased for both recording schemes.

When the recording scheme is different, the characteristics of the recording film suitable for use in the recording scheme are different. Thus, an optimum rotational speed must be changed accordingly.

The control circuit 6 comprises, e.g., a microcomputer and a memory, and manages control over the rotation of the spindle motor 4 and various other control operations to be described later.

An optical head 7 is arranged on the lower side of the optical disk 1a or 1b. The optical head 7 records/reproduces information on/from the optical disk 1a or 1b. The optical head 7 comprises a semiconductor laser oscillator 8, a collimator lens 9, a beam splitter 10, an objective lens 11, a known astigmatism optical system 14 consisting of a cylindrical lens 12 and a convex lens 13, a photodetector 15, lens actuators 16 and 17, and the like.

The optical head 7 is arranged to be movable by a moving mechanism (not shown) constituted by, e.g., a linear motor in the radial direction of the optical disk 1a or 1b. The optical head 7 is moved to a target track as the recording or reproduction target in accordance with a designation from the control circuit 6.

The semiconductor laser oscillator 8 generates a divergent laser beam in accordance with a drive signal output from a laser driver 20. When information is to be recorded on the optical disk 1a or 1b, the semiconductor laser oscillator 8 generates a laser beam having a modulated intensity in accordance with the information to be recorded. When information is to be read from the optical disk 1a or 1b and reproduced, the semiconductor laser oscillator 8 generates a laser beam having a predetermined intensity.

The divergent laser beam generated by the semiconductor laser oscillator 8 is converted into a parallel beam by the collimator lens 9 and guided to the beam splitter 10. The laser beam guided to the beam splitter 10 is transmitted through the beam splitter 10 to be incident on the objective lens 11, and is focused by the objective lens 11 toward the recording film of the optical disk 1a or 1b.

The objective lens 11 is supported by the lens actuator 16 serving as the lens driving mechanism to be movable along its optical axis. When the objective lens 11 is moved along its optical axis by a focus servo signal output from a focus/tracking control circuit 21, the convergent laser beam transmitted through the objective lens 11 is projected on the surface of the optical disk 1a or 1b, and a minimum beam spot is formed on the surface of the recording film of the optical disk 1a or 1b. In this state, the objective lens 11 is set in an in-focus state.

The objective lens 11 can be moved by the lens actuator 17 also in a direction perpendicular to the optical axis. The objective lens 11 is moved in accordance with a tracking servo signal from the focus/tracking control circuit 21 in the direction perpendicular to the optical axis.

The convergent laser beam transmitted through the objective lens 11 is projected on the surface of the recording film of the optical disk 1a or 1b, and is radiated on the recording track formed on the surface of the recording film of the optical disk 1a or 1b. In this state, the objective lens 11 is set in the in-focus state.

In the above in-focus state, information can be recorded and read.

In the in-focus state, the divergent laser beam reflected by the optical disk 1a or 1b is converted into a parallel beam by the objective lens 11, and is returned to the beam splitter 10. The parallel beam is reflected by the beam splitter 10 and guided to the photodetector 15 by the astigmatism optical system 14 consisting of the cylindrical lens 12 and the convex lens 13, and a focusing error appears as a change in shape of the image. A tracking error is detected in accordance with the known dual push-pull scheme.

The photodetector 15 is constituted by four photodetection cells (not shown) for converting light, which is formed into an image by the astigmatism optical system 14, into an electrical signal. A signal output from the photodetector 15 is supplied to the focus/tracking control circuit 21 and a signal amplifier 22.

In the focus/tracking control circuit 21, the signal from the photodetector 15 is input to a focus servo circuit (not shown) to generate a focus error signal, and is supplied to the lens actuator 16, thus forming a focus servo loop. The signal from the photodetector 15 is input also to a tracking servo circuit (not shown) to generate a tracking error signal, and is supplied to the lens actuator 17, thus forming a tracking servo loop.

The signal output from the photodetector 15 represents information recorded on the optical disk 1a or 1b, and is amplified by the signal amplifier 22 and output to a data demodulator 23.

Figure 4A:
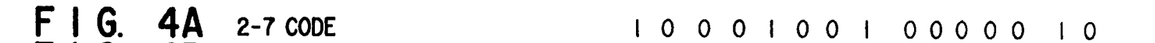
FIGS. 4A to 4M are signal charts for explaining signal waveforms at respective portions of the optical disk apparatus.
Figure 4B:
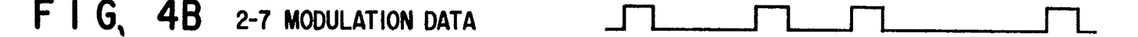
Figure 4C:
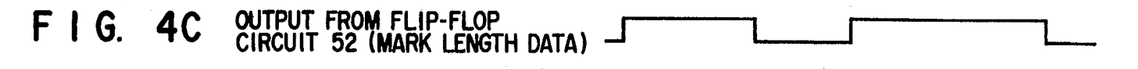
Figure 4D:
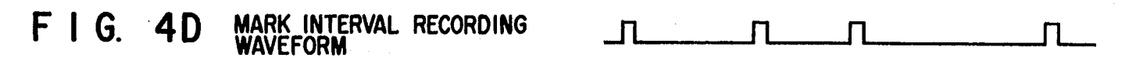
Figure 4E:
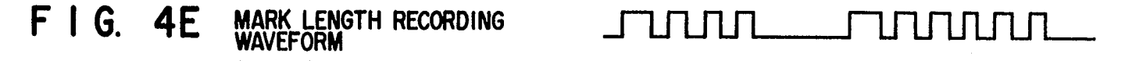
Figure 4F:
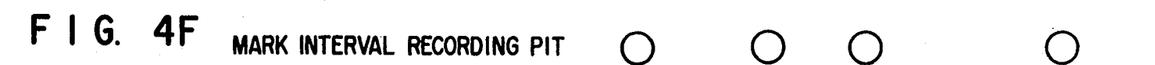
Figure 4G:
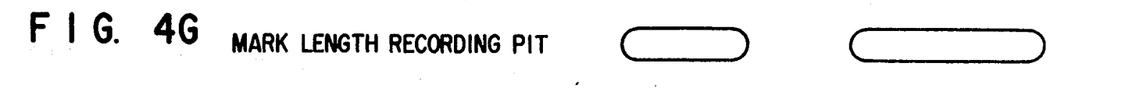
Figure 4H:
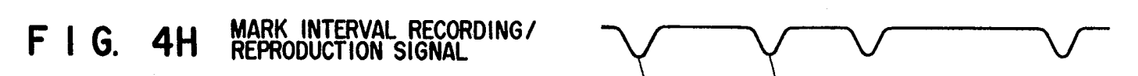
Figure 4I:
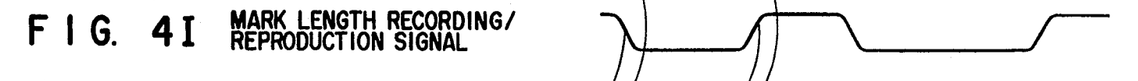

The signal amplifier 22 outputs a mark interval recording/reproduction signal, as shown in FIG. 4H, corresponding to a mark interval recording pit recorded on the optical disk 1a, as shown in FIG. 4F. For a mark length recording pit recorded on the optical disk 1b, as shown in FIG. 4G, the signal amplifier 22 outputs a mark length recording/production signal, as shown in FIG. 4I.

In response to a switching signal from the control circuit 6, the data demodulator 23 demodulates a signal output from the signal amplifier 22 in accordance with the mark interval or mark length recording scheme.

For example, the data demodulator 23 comprises a mark interval binarization circuit 24, a mark length binarization circuit 25, an edge detection circuit 26, a switching circuit 27, and a demodulation circuit 28.

The mark interval binarization circuit 24 binarizes a signal from the signal amplifier 22 by peak detection. A mark interval recording/reproduction signal from the mark interval binarization circuit 24 is output to the switching circuit 27.

Figure 4J:
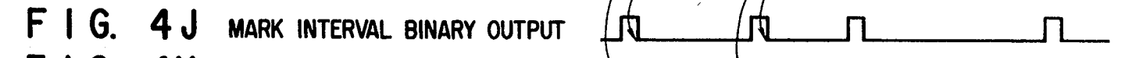

For example, the mark interval binarization circuit 24 binarizes the mark interval recording/reproduction signal, as shown in FIG. 4H, to a mark interval binary signal, as shown in FIG. 4J.

Figure 4K:
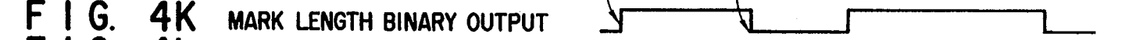

The mark length binarization circuit 25 binarizes the signal output from the signal amplifier 22 with reference to its central level as a threshold. For example, the mark length binarization circuit 25 binarizes the mark length recording/reproduction signal, as shown in FIG. 4I, to a mark length binary signal, as shown in FIG. 4K. The mark length recording/reproduction signal from the mark length binarization circuit 25 is output to the edge detection circuit 26.

Figure 4L:
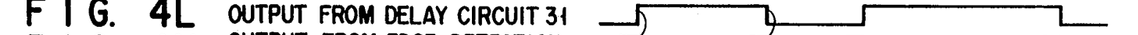
Figure 4M:
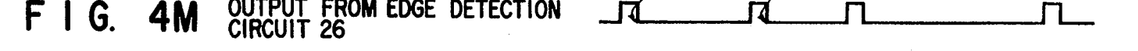

The edge detection circuit 26 outputs an edge detection signal, as shown in FIG. 4M, corresponding to the leading and trailing edges of the mark length binary signal, as shown in FIG. 4K, output from the mark length binarization circuit 25.

The edge detection circuit 26 comprises a delay circuit 31 and an exclusive OR circuit 32.

The delay circuit 31 delays the mark length binary signal from the mark length binarization circuit 25, as shown in FIG. 4K, to be a signal, as shown in FIG. 4L, and outputs the delay signal to the exclusive OR circuit 32.

The exclusive OR circuit 32 outputs an exclusive OR of the mark length binary signal (FIG. 4K) from the mark length binarization circuit 25 and the delay signal (FIG. 4L) delayed by the delay circuit 31 as an edge detection signal (FIG. 4M).

The edge detection signal from the edge detection circuit 26, i.e., from the exclusive OR circuit 32 is output to the switching circuit 27.

The switching circuit 27 selectively outputs the mark interval recording/reproduction signal from the mark interval binarization circuit 24 and the edge detection signal from the edge detection circuit 26 in accordance with the switching signal supplied from the control circuit 6.

The switching circuit 27 comprises AND circuits 33 and 34, an inverter circuit 35, and an OR circuit 36.

When a "1" signal is supplied from the control circuit 6 to the switching circuit 27 as the switching signal, the gate of the AND circuit 34 is opened, and the edge detection signal from the edge detection circuit 26 is output to the demodulation circuit 28. When a "0" signal is supplied from the control circuit 6 to the switching circuit 27 as the switching signal, the gate of the AND circuit 33 is opened, and the mark interval recording/reproduction signal from the mark interval binarization circuit 24 is output to the demodulation circuit 28.

The demodulation circuit 28 demodulates the mark interval recording/reproduction signal or the edge detection signal from the switching circuit 27 in accordance with inverse 2-7 code conversion.

An output from the data demodulator 23, i.e., the demodulated data from the demodulation circuit 28 is output to an error correction circuit 41 and an address decoder circuit 42.

The error correction circuit 41 corrects an error in the demodulated data from the demodulation circuit 28, or adds an error correction code to the recording data, supplied from an interface circuit 43 through a buffer memory 44, and outputs the new recording data to a modulation circuit 51 in a data modulator 50.

The address decoder circuit 42 reads an address from the demodulated data demodulated by the demodulation circuit 28. The decoding result of the address is output to the control circuit 6.

The interface circuit 43 outputs reproduction data, supplied from the error correction circuit 41 through the buffer memory 44, to the host computer as an external unit, or outputs recording data supplied from the external unit to the error correction circuit 41 through the buffer memory 44.

Upon reception of the switching signal from the control circuit 6, the data modulator 50 performs modulation, recording waveform equalization, and the like in accordance with the mark interval or mark length recording scheme.

For example, the data modulator 50 comprises the modulation circuit 51, a flip-flop circuit 52, a mark interval recording waveform equalizer 53, a mark length recording waveform equalizer 54, and a switching circuit 55.

The modulation circuit 51 modulates the recording data supplied from the error correction circuit 41 to a signal suitable for recording, i.e., 2-7 modulation data.

The 2-7 modulation data from the modulation circuit 51 is output to the flip-flop circuit 52 and the mark interval recording waveform equalizer 53.

The flip-flop circuit 52 changes the 2-7 modulation data from the modulation circuit 51, as shown in FIG. 4B, to mark length data, as shown in FIG. 4C, and outputs it to the mark length recording waveform equalizer 54.

The mark interval recording waveform equalizer 53 is a recording compensation circuit, and equalizes the recording waveform of the modulation data from the modulation circuit 51 by adjusting its amplitude and width in accordance with a recording position (an address supplied from the control circuit 6) on the optical disk 1a, so that the mark interval recording scheme pits are formed on the optical disk 1a as accurately as possible. Then, a mark interval recording waveform, as shown in FIG. 4D, is obtained from the 2-7 modulation data from the modulation circuit 51, as shown in FIG. 4B.

The mark length recording waveform equalizer 54 is a recording compensation circuit, and equalizes the recording waveform of the output waveform of the flip-flop circuit 52 by performing thermal control in accordance with the recording length, so that the mark length recording scheme pits are formed on the optical disk 1b as accurately as possible to correspond to the modulation data from the modulation circuit 51.

More specifically, the mark length recording waveform equalizer 54 does not set the pulse length to "1" over the entire pit width, but temporarily sets the pulse length to "0" (to intermittent pulses), thus preventing an excessive heat increase. Then, a mark length recording waveform, as shown in FIG. 4D, can be obtained from the mark length data from the flip-flop circuit 52, as shown in FIG. 4C.

The recording waveform of the mark interval recording waveform equalizer 53 and the recording waveform of the mark length recording waveform equalizer 54 are supplied to the switching circuit 55.

The switching circuit 55 selectively outputs the recording waveform from the mark interval recording waveform equalizer 53 and the recording waveform from the mark length recording waveform equalizer 54 in response to the switching signal supplied from the control circuit 6.

The mark interval recording waveform or the mark length recording waveform from the switching circuit 55 is output to the laser driver 20.

Then, when the laser driver 20 is controlled by the mark interval recording waveform, the mark interval recording scheme pits, as shown in FIG. 4F, are formed on the optical disk 1a. When the laser driver 20 is controlled by the mark length recording waveform, the mark length recording scheme pits, as shown in FIG. 4G, are formed on the optical disk 1b.

The signal amplified by the signal amplifier 22 is converted into digital data by an A/D converter 59 and output to the control circuit 6. Thus, while the laser beam from the optical head 7 is radiated on an innermost mirror portion 71 or 72 (FIG. 2) (a region where no track, e.g., a guide groove, exists) of the optical disk 1a or 1b, the control circuit 6 may detect the reflectivity of the optical disk 1a or 1b in accordance with the digital data supplied from the A/D converter 59, and may discriminate whether the optical disk 1a or 1b is of the mark interval or mark length recording scheme in accordance with the detection result which varies depending on the difference in reflectivity.

A detector 60 is provided for detecting the identifier 3a representing the recording scheme of the optical disk 1a or 1b stored in the cartridge 2 or 3 mounted on the spindle motor 4. For example, the detector 60 comprises a light source 61, e.g., a light-emitting diode, and a photodetection element 62. The detection output of the detector 60 is supplied to a recording scheme discrimination circuit 63.

The recording scheme discrimination circuit 63 discriminates whether the optical disk 1a or 1b is of the mark interval (pit position) recording scheme or the mark length recording scheme from the detection output from the detector 60, and comprises a comparator or the like. The discrimination result of the recording scheme discrimination circuit 63 is output to the control circuit 6. When the discrimination result indicates the mark length recording scheme, the recording scheme discrimination circuit 63 outputs a "1" signal; when it indicates the mark interval recording scheme, the discrimination circuit 63 outputs a "0" signal.

When the output from the recording scheme discrimination circuit 63 is a "1" signal, the control circuit 6 discriminates that the optical disk 1b of the mark length recording scheme is mounted. When the output from the recording scheme discrimination circuit 63 is a "0" signal, the control circuit 6 discriminates that the optical disk 1a of the mark interval recording scheme is mounted.

When the optical disk 1a or 1b is mounted on the spindle motor 4, the control circuit 6 reads a header 81

(82) of the optical disk 1a (1b) in accordance with the mark interval recording scheme. When the header is correctly read, the control circuit 6 discriminates that the optical disk 1a of the mark interval recording scheme is mounted, and continues recording and/or reproduction on/from the optical disk 1a.

When the header is not correctly read, the control circuit 6 reads the header 81 (82) of the optical disk 1a (1b) in accordance with the mark length recording scheme. Then, when the header is correctly read, the control circuit 6 discriminates that the optical disk 1b of the mark length recording scheme is mounted, and continues recording/reproduction on/from the optical disk 1b.

When the header is to be read in accordance with the mark interval recording scheme, the control circuit 6 outputs a "0" signal as a switching signal to the switching circuits 27 and 55. The control circuit 6 also outputs a rotational speed setting control signal for mark interval recording to the spindle motor control circuit 5, thereby setting the rotational speed for mark interval recording/reproduction.

In this state, the gate of the AND circuit 33 of the switching circuit 27 is opened, and the binary signal from the mark interval binarization circuit 24 is output to the demodulation circuit 28.

Then, the content of the header read by the photodetector in the optical head 7 is amplified by the signal amplifier 22, binarized by the mark interval binarization circuit 24, demodulated by the demodulation circuit 28, decoded by the address decoder circuit 42, and output to the control circuit 6.

When the header is to be read in accordance with the mark length recording scheme, the control circuit 6 outputs a "1" signal as a switching signal to the switching circuits 27 and 55. The control circuit 6 also outputs a rotational speed setting control signal for mark length recording to the spindle motor control circuit 5, thereby setting the rotational speed for mark length recording/reproduction.

In this state, the gate of the AND circuit 34 of the switching circuit 27 is opened, and the binary signal from the edge detection circuit 26 is output to the demodulation circuit 28.

Then, the content of the header read by the photodetector 15 in the optical head 7 is amplified by the signal amplifier 22, binarized by the mark length binarization circuit 25, demodulated by the demodulation circuit 28, decoded by the address decoder circuit 42, and output to the control circuit 6.

In this embodiment, the header is read in accordance with the mark interval recording scheme, and when it cannot be read, it is read in accordance with the mark length recording scheme. However, this reading order may be reversed.

Figure 5A:
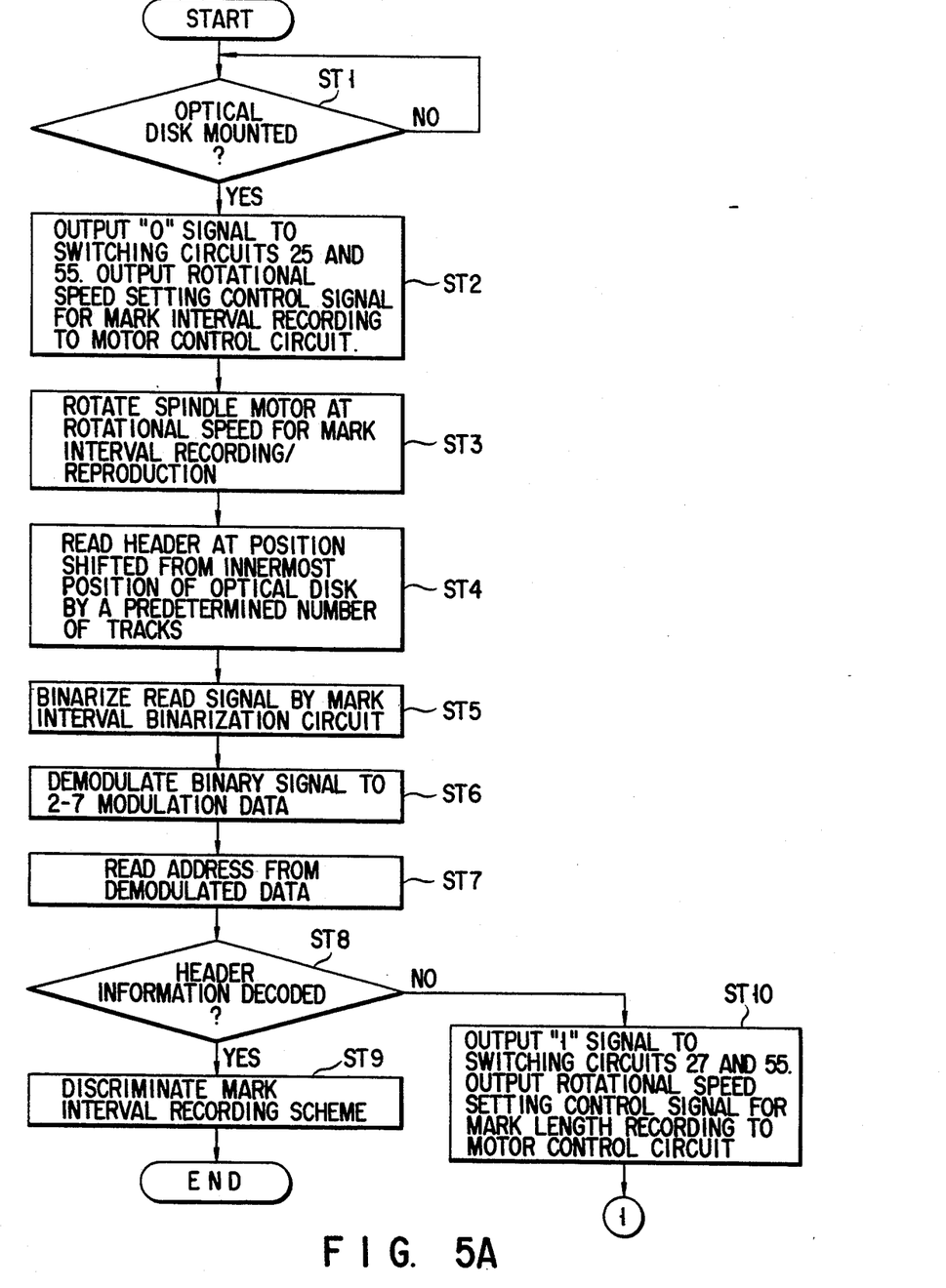
FIGS. 5A and 5B are flow charts for explaining an operation of discriminating the recording scheme of an optical disk.
Figure 5B:
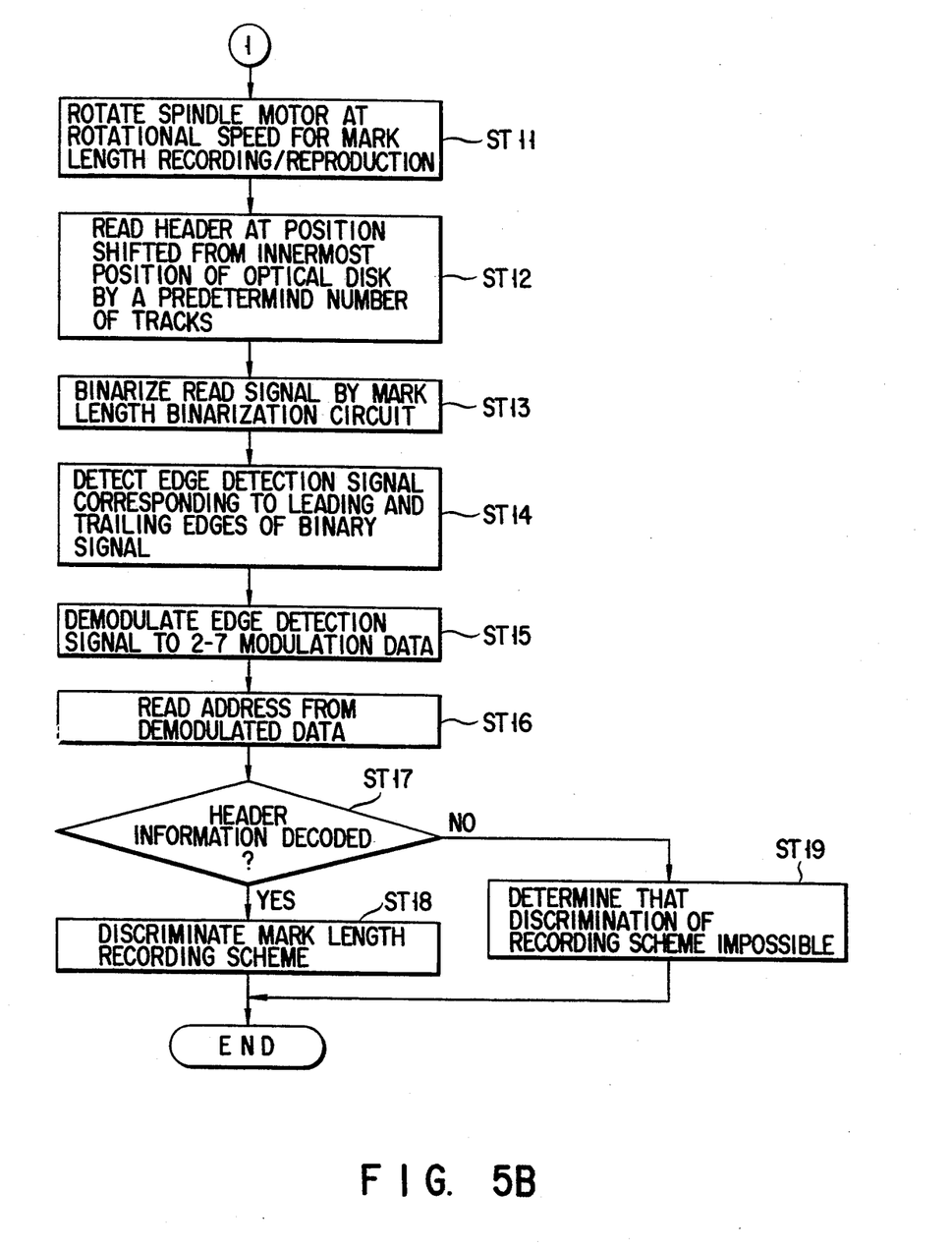

With the arrangement as described above, an operation of discriminating the recording scheme of the optical disk 1a or 1b will be described with reference to the flow charts of FIGS. 5A and 5B.

First, the optical disk 1a or 1b is mounted on the spindle motor 4 (ST1). Then, the control circuit 6 outputs a "0" signal as the switching signal to the switching circuits 27 and 55, and a rotational speed setting control signal for mark interval recording to the spindle motor control circuit 5 (ST2).

As a result, the spindle motor 4 is rotated by the motor control circuit 5 at the rotational speed for mark interval recording/reproduction, and mark interval recording/reproduction is enabled (ST3).

In this state, reading of the header 81 (82) is started at a position shifted from the innermost position of the optical disk 1a (1b) by a predetermined number of tracks (ST4).

The content of the header 81 (82) of the optical disk 1a (1b) is subjected to photoelectric conversion by the photodetector 15 in the optical head 7 and amplified by the signal amplifier 22, and a reproduction signal is output. The reproduction signal is binarized by the mark interval binarization circuit 24 to be a binary signal (ST5).

An output from the mark interval binarization circuit 24 is supplied to the demodulation circuit 28 through the switching circuit 27. The demodulation circuit 28 demodulates the supplied binary signal in accordance with inverse 2-7 code conversion, and outputs the demodulated data to the address decoder circuit 42 (ST6).

Thus, the address decoder circuit 42 performs address reading, and the read result is output to the control circuit 6 (ST7).

As a result, when a correct address, i.e., header information is supplied from the address decoder circuit 42 to the control circuit 6 (YES in ST8), the control circuit 6 discriminates the mark interval recording scheme (ST9).

When a correct address, i.e., header information is not supplied from the address decoder circuit 42 to the control circuit 6 (NO in ST8), the control circuit 6 outputs a "1" signal as a switching signal to the switching circuits 27 and 55, and a rotational speed setting control signal for mark length recording to the motor control circuit 5 (ST10).

As a result, the spindle motor 4 is rotated by the spindle motor control circuit 5 at the rotational speed for mark length recording/reproduction, and mark length recording/reproduction is enabled (ST11).

In this state, reading of the header 81 (82) is started at a position shifted from the innermost position of the optical disk 1a (1b) by a predetermined number of tracks (S12).

The content of the header 81 (82) of the optical disk 1a (1b) is subjected to photoelectric conversion by the photodetector 15 in the optical head 7 and amplified by the signal amplifier 22, and a reproduction signal is output. The reproduction signal is binarized by the mark length binarization circuit 25 to be a binary signal (S13).

An output from the mark length binarization circuit 25 is supplied to the edge detection circuit 26, and an edge detection signal corresponding to the leading and trailing edges of the binary signal is detected (ST14). The edge detection signal from the edge detection circuit 26 is supplied to the demodulation circuit 28 through the switching circuit 27. The demodulation circuit 28 demodulates the supplied edge detection signal in accordance with inverse 2-7 code conversion, and outputs the demodulated data to the address decoder circuit 42 (ST15).

Thus, the address decoder circuit 42 performs address reading, and the read result is output to the control circuit 6 (ST16).

As a result, when a correct address, i.e., header information is supplied from the address decoder circuit 42 to the control circuit 6 (YES in ST17), the control circuit 6 discriminates the mark length recording scheme (ST18).

Hence, reading of the header 81 (82) on the optical disk 1a (1b) can be performed by switching the switching circuit 27, and header decoding can be performed, so that whether the recording scheme is the mark length or mark interval recording scheme can be discriminated.

When the header cannot be decoded in ST17 (NO in ST17), the control circuit 6 determines that discrimination of the recording scheme is impossible, and processing is completed (ST19). The control circuit 6 may return to ST2.

Figure 6A:
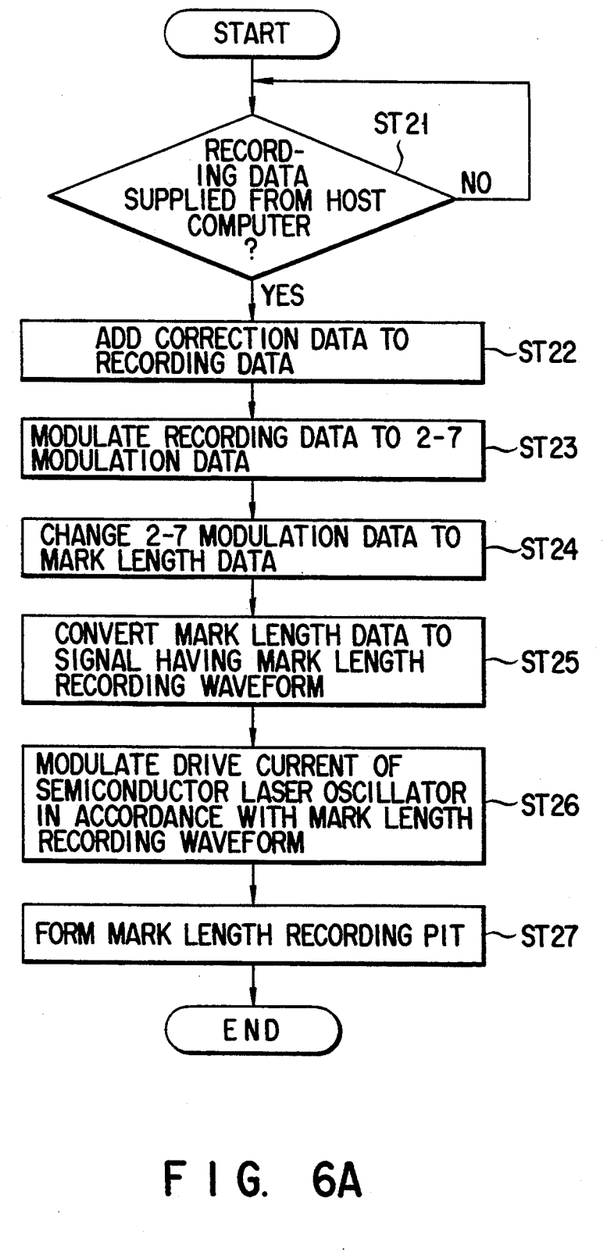
FIGS. 6A and 6B are flow charts for explaining an operation of recording/reproducing information on and from an optical disk employing the mark length recording scheme.
Figure 6B:
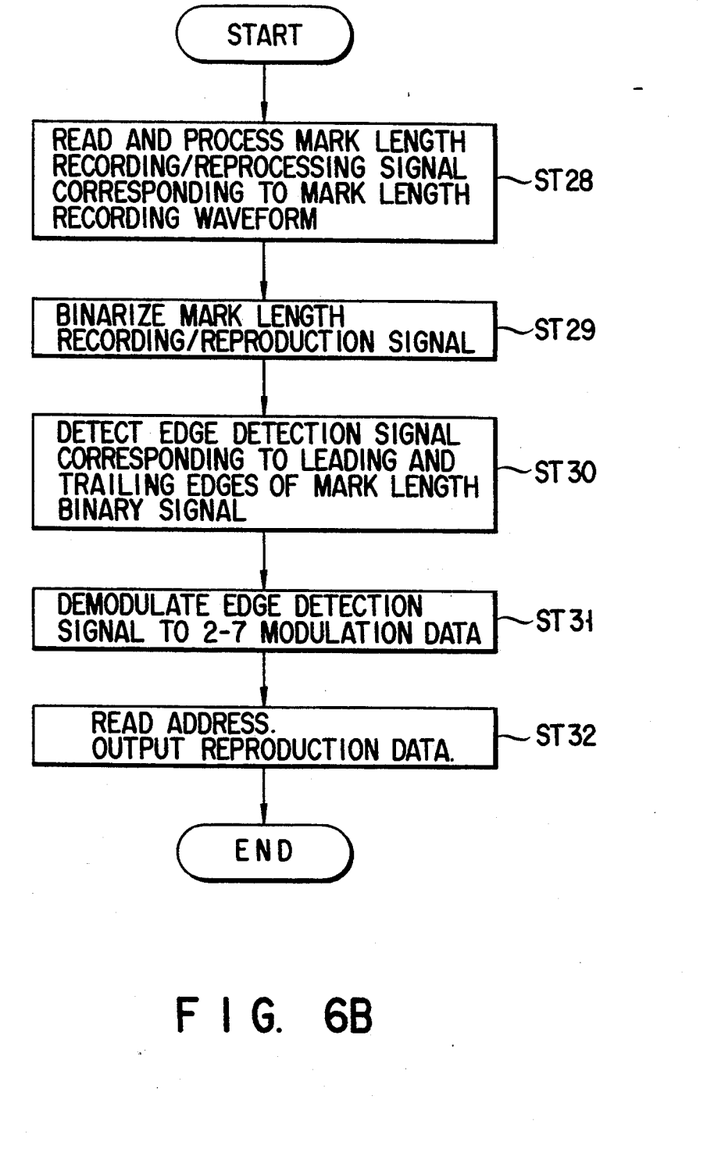

An operation of recording/reproducing information performed when the control circuit 6 discriminates that the optical disk 1b of the mark length recording scheme is mounted will be described with reference to the flow charts of FIGS. 6A and 6B.

That is, during recording, digital data (recording data) is supplied from the host computer through the interface circuit 43, and is supplied to the error correction circuit 41 through the buffer memory 44 (ST21). The error correction circuit 41 adds a correction code to the supplied recording data, and outputs the new recording data to the modulation circuit 51 (ST22). The modulation circuit 51 modulates the supplied recording data to the 2-7 modulation data, as shown in FIG. 4B, and outputs it to the flip-flop circuit 52 (ST23). The flip-flop circuit 52 converts the 2-7 modulation data to the mark length data, as shown in FIG. 4C, and outputs it to the mark length recording waveform equalizer 54 (ST24).

The mark length recording waveform equalizer 54 converts the supplied mark length data to a signal having a mark length recording waveform, as shown in FIG. 4E (ST25). The signal having this mark length recording waveform is supplied to the laser driver 20 through the switching circuit 55.

The laser driver 20 modulates the drive current of the semiconductor laser oscillator 8 in accordance with the supplied mark length recording waveform (ST26). Then, a laser beam corresponding to the mark length recording waveform is radiated on the optical disk 1b through the collimator lens 9, the beam splitter 10, and the objective lens 11, and a mark length recording pit, as shown in FIG. 4G, is formed on the optical disk 1b (ST27).

During reproduction, the mark length recording pit (FIG. 4G) formed on the optical disk 1b is subjected to photoelectric conversion by the photodetector 15 in the optical head 7 and amplified by the signal amplifier 22, and a mark length recording/reproduction signal, as shown in FIG. 4I, is output (ST28). This mark length recording/reproduction signal is binarized by the mark length binarization circuit 25 to be a mark length binary signal, as shown in FIG. 4K (ST29).

An output from the mark length binarization circuit 25 is supplied to the edge detection circuit 26, and an edge detection signal corresponding to the leading and trailing edges of the mark length binary signal, as shown in FIG. 4M, is detected (ST30). The edge detection signal is supplied from the edge detection circuit 26 to the demodulation circuit 28 through the switching circuit 27. The demodulation circuit 28 demodulates the supplied edge detection signal in accordance with inverse 2-7 code conversion, and outputs the 2-7 modulation data to the error correction circuit 41 and the address decoder circuit 42 (ST31).

The address decoder circuit 42 performs address reading. The read result is output to the control circuit 6. Simultaneously, the 2-7 modulation data is corrected by the error correction circuit 41 and output as the reproduction data to the host computer through the buffer memory 44 and the interface circuit 43 (ST32).

Figure 7A:
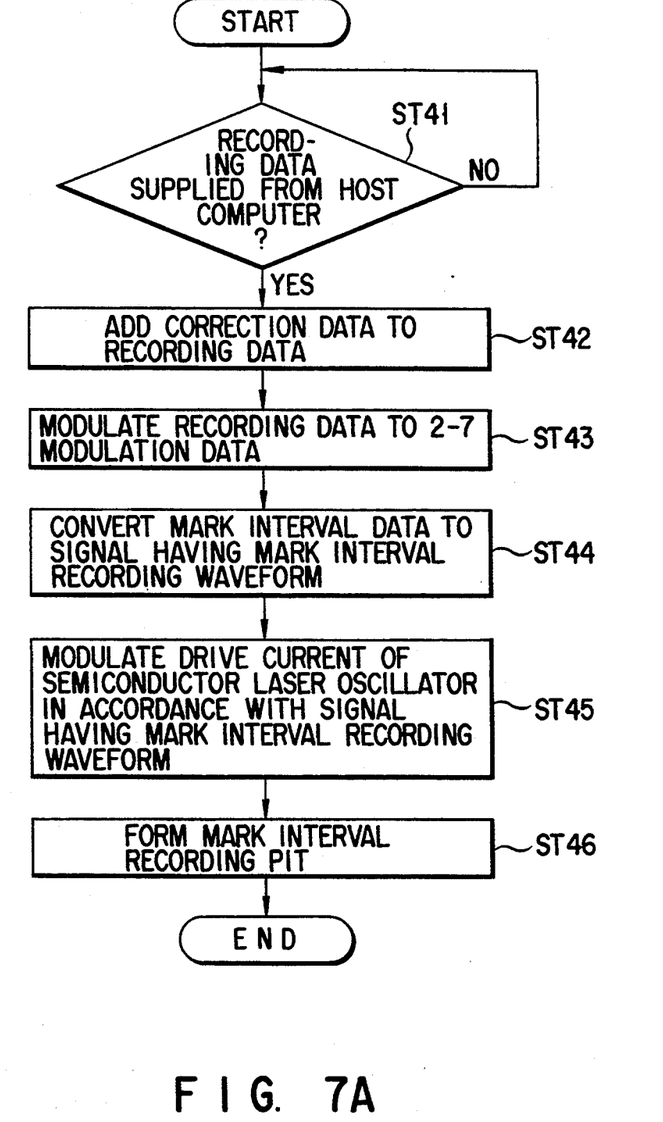
FIGS. 7A and 7B are flow charts for explaining an operation of recording/reproducing information on and from an optical disk employing the mark interval recording scheme.
Figure 7B:
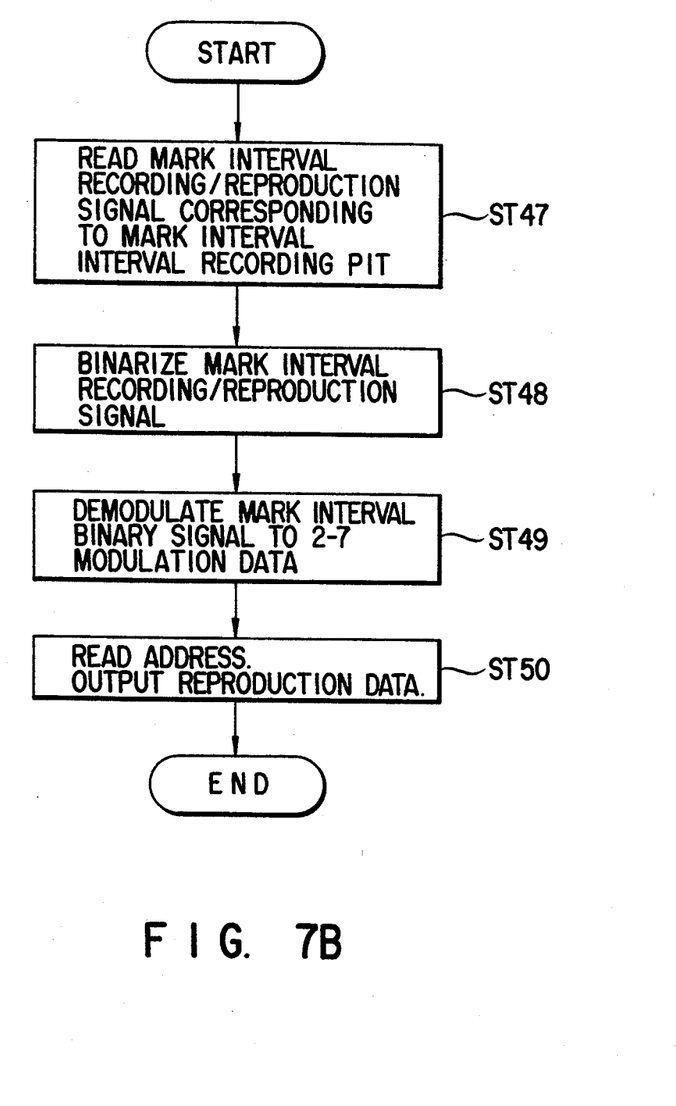

An operation of recording/reproducing information performed when the control circuit 6 discriminates that the optical disk 1a of the mark interval recording scheme is mounted will be described with reference to the flow charts of FIGS. 7A and 7B.

That is, during recording, digital data (recording data) is supplied from the host computer through the interface circuit 43, and is supplied to the error correction circuit 41 through the buffer memory 44 (ST41). The error correction circuit 41 adds a correction code to the supplied recording data, and outputs the new recording data to the modulation circuit 51 (ST42). The modulation circuit 51 modulates the supplied recording data to the 2-7 modulation data, as shown in FIG. 4B, and outputs it to the mark interval recording waveform equalizer 53 (ST43).

The mark interval recording waveform equalizer 53 converts the supplied mark interval data to a signal having a mark interval recording waveform, as shown in FIG. 4D (ST44). The signal having this mark interval recording waveform is supplied to the laser driver 20 through the switching circuit 55.

The laser driver 20 modulates the drive current of the semiconductor laser oscillator 8 in accordance with the supplied signal having the mark interval recording waveform (ST45). Then, a laser beam corresponding to the mark interval recording waveform is radiated on the optical disk 1a through the collimator lens 9, the beam splitter 10, and the objective lens 11, and a mark interval recording pit, as shown in FIG. 4F, is formed on the optical disk 1a (ST46).

During reproduction, the mark interval recording pit (FIG. 4F) formed on the optical disk 1a is subjected to photoelectric conversion by the photodetector 15 in the optical head 7 and amplified by the signal amplifier 22, and a mark interval recording/reproduction signal, as shown in FIG. 4H, is output (ST47). This mark interval recording/reproduction signal is binarized by the mark interval binarization circuit 24 to be a mark interval binary signal, as shown in FIG. 4J (ST48).

An output from the mark interval binarization circuit 24 is supplied to the demodulation circuit 28 through the switching circuit 27. The demodulation circuit 28 demodulates the supplied mark interval binary signal in accordance with inverse 2-7 code conversion, and outputs it to the error correction circuit 41 and the address decoder circuit 42 (ST49).

The address decoder circuit 42 performs address reading. The read result is output to the control circuit 6. Simultaneously, the demodulated data is corrected by the error correction circuit 41 and output as the reproduction data to the host computer through the buffer memory 44 and the interface circuit 43 (ST50).

When the cartridge 2 or 3 shown in FIG. 3A or 3B is mounted on the spindle motor 4, the detector 60 shown in FIG. 1 may output a detection signal corresponding to the presence/absence of the identifier 3a to the control circuit 6 through the recording scheme discrimination circuit 63, and the control circuit 6 may perform discrimination between the mark length and mark interval recording schemes in accordance with the detection signal.

A means of discriminating different recording schemes according to another embodiment of the present invention will be described.

On each of the innermost regions 71 and 72 of the optical disks 1a and 1b shown in FIGS. 2A and 2B employing the different recording schemes, there exists a portion called a mirror portion, which is outside the information recording region and in which no guide groove (track) is formed. Since a recording film is formed on this region (mirror portion) 71 or 72 by coating, the reflectivity of the recording film can be measured at this portion.

More specifically, only the focus control circuit of the focus/tracking control circuit 21 is actuated to perform focusing. The light reflected by the mirror portion 71 or 72 is reflected by the beam splitter 10 through the objective lens 11, is subjected to photoelectric conversion by the photodetector 15, and is amplified by the signal amplifier 22. The amplified signal is digitized by the A/D converter 59 and supplied to the control circuit 6. Thus, the control circuit 6 measures the reflectivity from the supplied digital data, and discriminates the recording scheme of the optical disk 1a or 1b in accordance with the value of the reflectivity.

Conventionally, since the optical disk 1a used for mark interval recording is partially melted and recessed by the laser beam to form a pit (FIG. 4F), the pit does not reflect light. Hence, the conventional recording film of the mark interval recording scheme generally has a high reflectivity (50 to 40%).

On the other hand, for the optical disk 1b for mark length recording, recording which is done by recessing of a recording film is not suitable, and recording which is done by a change from an amorphous state to a crystal state or alloying recording by diffusion between two recording films is suitable. The reflectivity of such a recording film is about 10 to 20%.

Hence, when the light reflected by the mirror portion 71 or 72 is obtained by the control circuit 6 through the A/D converter 59, if the supplied reflectivity is high, the control circuit 6 determines that the optical disk 1a of the mark interval recording scheme is mounted; when the supplied reflectivity is low, the control circuit 6 determines that the optical disk 1b of the mark length recording scheme is mounted.

A means of discriminating different recording schemes according to still another embodiment of the present invention will be described.

That is, according to this embodiment, the number of headers on the optical disk 1a or 1b per track is counted, and whether the disk is of the mark interval or mark length recording scheme can be discriminated in accordance with the obtained count.

When the mark length recording scheme is employed, the recording density theoretically becomes twice that of the case when the mark interval recording scheme is employed. Accordingly, as shown in FIGS. 2A and 2B, the mark length recording scheme has a larger number of headers than that of the mark interval recording scheme.

Figure 8:
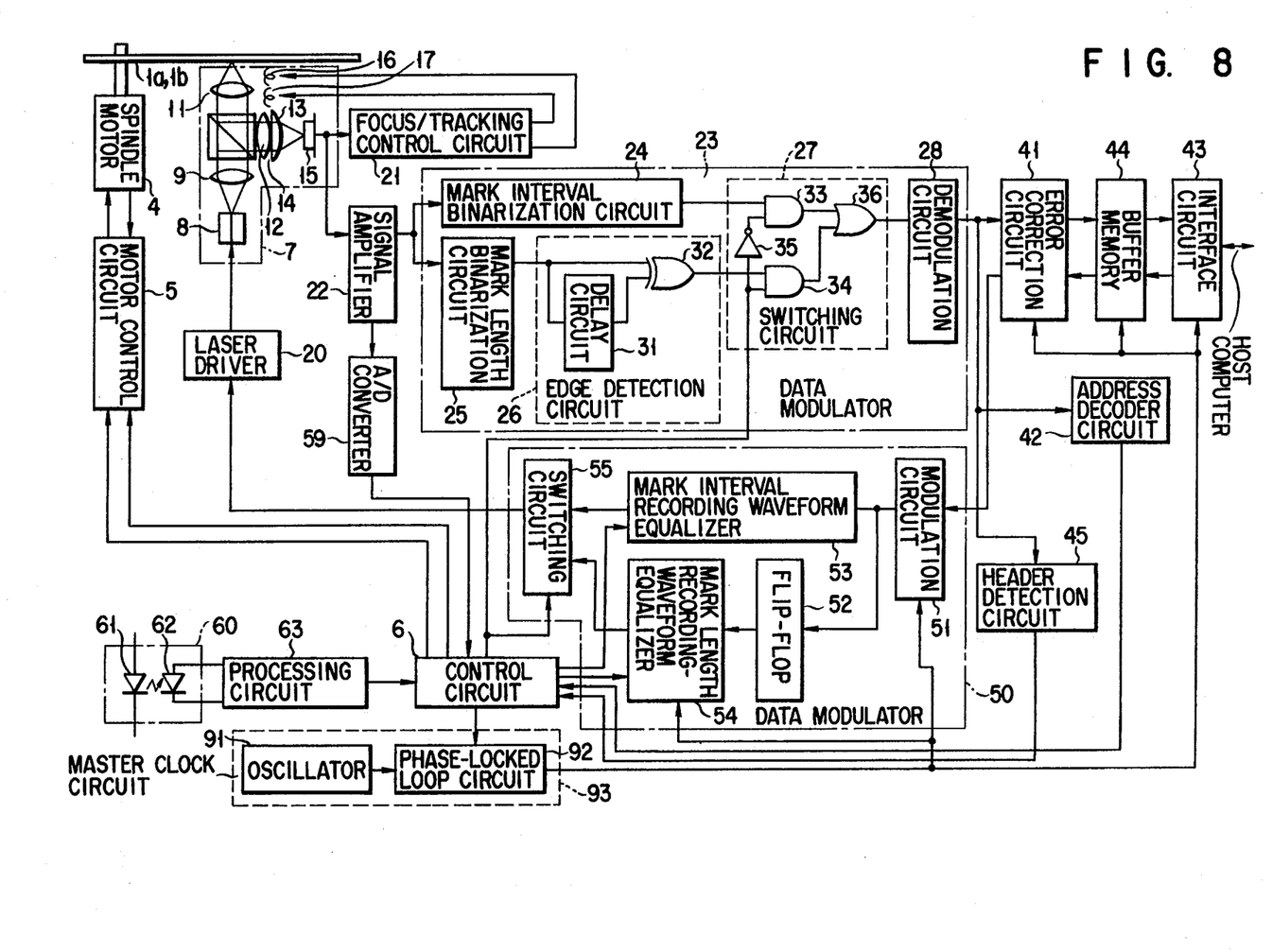
FIG. 8 is a block diagram showing the arrangement of an optical disk apparatus according to another embodiment of the present invention.

This embodiment can be realized by adding a header detection circuit 45, as shown in FIG. 8.

More specifically, as shown in FIG. 8, the header detection circuit 45 detects the headers from the demodulation data output from the demodulation circuit 28, and comprises, e.g., an envelope detector and a binarization circuit (neither are shown). Thus, a pulse signal corresponding to a header is output to the control circuit 6.

The control circuit 6 counts the number of headers per track by counting the pulse signals corresponding to one track and sent from the header detection circuit 45, and discriminates whether the mark interval or mark length recording scheme is employed in accordance with the count. For example, when the number of headers per track is 15, the control circuit 6 determines that the mark interval recording scheme is employed; when the number of headers per track is 30, the control circuit 6 determines that the mark length recording scheme is employed.

More specifically, the recording scheme can be discriminated by performing counting by the control circuit 6 through the header detection circuit 45. In this case, since the header detection circuit 45 need only detect a header portion as a block of information, whether the switching circuit 27 selects the mark interval recording/reproduction signal from the mark interval binarization circuit 24 or the edge detection signal sent from the edge detection circuit 26 poses no problem.

When the headers are to be detected by the header detection circuit 45, in order to detect a correct number of headers, the headers are detected at a specific position (the same radial position) of the track as a target of discrimination of the optical disk 1a or 1b where only headers are formed and no data information is recorded.

A plurality of embodiments of means for discriminating the recording scheme have been described above. These embodiments may be used independently. However, if these embodiments are combined to perform discrimination, the recording scheme can be discriminated more reliably.

That is, if discrimination is made when the results of two or more discriminating means coincide, the recording scheme can be discriminated reliably.

From the discrimination result of the recording scheme, the rotational speeds of the spindle motor 4 corresponding to each recording scheme can be changed through the control circuit 6.

An embodiment wherein the recording capacity per track is gradually increased toward outer tracks even with both recording schemes will be described.

As shown in FIG. 8, a master clock circuit 93 comprising an oscillator 91 for generating a signal having a predetermined frequency and a phase-locked loop (PLL) circuit 92 for frequency-dividing the signal from the oscillator 91 at a frequency division ratio set by the control circuit 6 is provided. The respective circuits of the recording and reproduction systems are operated by an output from the master clock circuit 93.

When the clock frequency of the master clock circuit 93 is gradually increased toward the outer periphery of the optical disk 1a or 1b, the recording capacity per track can be increased regardless of the recording scheme. More specifically, in either recording scheme, recording and reproduction (recording and reproduction by an MCAV) at a predetermined line density can be performed while the optical disk 1a or 1b is rotated at a predetermined corresponding rotational speed.

As has been described above, the present invention provides an information recording/reproducing apparatus, having the spindle motor 4 for rotating the circular optical disk 1a or 1b, for recording/reproducing information on/from the optical disk 1a or 1b rotated by the spindle motor 4, wherein whether the recording scheme of the optical disk 1a or 1b is the mark interval or mark length recording scheme is discriminated, and information can be recorded/reproduced while the optical disk 1a or 1b is rotated at a rotational speed corresponding to the discriminated recording scheme.

Hence, in an apparatus for recording/reproducing information in accordance with both the mark interval and mark length recording schemes, the signal amplifier, the demodulation circuit, the modulation circuit, the error correction circuit, the buffer memory, the interface circuit, and the like can be commonly used between the two recording schemes, thereby decreasing the number of signal processing circuits.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An apparatus for recording data on a first type recording medium on which marks are formed and data is recorded by means of mark lengths and lengths of spaces between marks, or a second type recording medium, on which marks are formed and data is recorded by means of lengths of mark-to-mark intervals and reproducing data recorded on said first type recording medium and said second type recording medium, said apparatus comprising:

means for supporting a recording medium;

means for determining the type of said recording medium supported by said supporting means;

means for storing a first rotational speed for said first type recording medium and a second rotational speed for said second type recording medium, which is higher than the first rotational speed;

means for rotating said recording medium supported by said supporting means at the first rotational speed when said determining means determines that said recording medium supported by said supporting means is said first type recording medium, and rotating said recording medium supported by said supporting means at the second rotational speed when said determining means determines that said recording medium supported by said supporting means is said second type recording medium;

means for recording data on said recording medium supported by said supporting means, while said recording medium is rotated by said rotating means; and means for reproducing data recorded on said recording medium supported by said supporting means, while said recording medium is rotated by said rotating means wherein said reproducing means includes second signal processing means for reproducing data on both said first type recording medium and said second type recording medium, and wherein said second signal processing means comprises an amplifier and a demodulation circuit that are used commonly for both said first type recording medium and said second type recording medium, and a binarization circuit not used commonly for both said first type recording medium and said second type medium.

2. An apparatus according to claim 1, wherein said recording means has first signal processing means, for recording data on both said first type recording medium and said second type recording medium.

3. An apparatus according to claim 2, wherein said first signal processing means comprises a modulation circuit commonly used both said first type recording medium and said second type recording medium, and the recording compensation circuit not commonly used both said first type recording medium and said second type recording medium.

4. An apparatus according to claim 1, wherein said rotating means includes control means for controlling rotation of said recording means, such that data transfer rates with respect to said first type recording medium and said second type recording medium become substantially equal to each other.

5. An apparatus for reproducing data recorded on a first type recording medium, on which marks having different lengths are formed and data is recorded by means of mark lengths and lengths of spaces between marks, or a second type recording medium on which marks are formed and data is recorded by means of lengths of mark-to-mark intervals, said apparatus comprising:

means for supporting a recording medium;

means for determining the type of said recording medium supported by said supporting means;

means for storing a first rotational speed for said first type recording medium and a second rotational speed for said second type recording medium, said second rotational speed being higher than the first rotational speed;

means for rotating said recording medium supported by said supporting means at the first rotational speed when said determining means determines that said recording medium supported by said supporting means is said first type recording medium, and rotating said recording medium supported by said supporting means at the second rotational speed when said determining means determines that said recording medium supported by said supporting means is said second type recording medium; and means for reproducing data recorded on said recording medium supported by said supporting means, while said recording medium is rotated by said rotating means wherein said reproducing means includes signal processing means for reproducing data on both said first type recording medium and said second type recording medium, and wherein said signal processing means comprises an amplifier and a demodulation circuit that are used commonly for both said first type recording medium and said second type recording medium, and a binarization circuit not used commonly for both said first type recording medium and said second type recording medium.

6. An apparatus according to claim 5, wherein said rotating means includes control means for controlling rotation of said recording means, such that data transfer rates with respect to said first type recording medium and said second type recording medium become substantially equal to each other.

* * * * *